United States Patent [19]

Salvo

[11] Patent Number: 4,615,682
[45] Date of Patent: Oct. 7, 1986

[54] TEACHING SYSTEM UTILIZING MAGNETIC TAPE

[76] Inventor: Andrew D. Salvo, 10 Gloria Pl., East Haven, Conn. 06512

[21] Appl. No.: 680,802

[22] Filed: Dec. 13, 1984

[51] Int. Cl.⁴ .............................................. G09B 7/06
[52] U.S. Cl. ..................................... 434/321; 434/335; 434/331; 434/337; 242/197; 242/188; 360/74.6
[58] Field of Search ............... 434/319, 320, 321, 335, 434/337, 331; 242/188, 197; 360/74.6

[56] References Cited

U.S. PATENT DOCUMENTS

| | | | |
|---|---|---|---|
| 2,683,568 | 7/1954 | Lindsay | 242/55 |
| 2,855,703 | 10/1958 | Stanton | 35/35 |
| 3,222,597 | 12/1965 | Beatenbough et al. | 324/73 |
| 3,288,385 | 11/1966 | Markakis et al. | 242/55.11 |
| 3,614,020 | 10/1971 | Herger | 242/188 |
| 3,615,155 | 10/1971 | Gelbman | 242/188 |
| 3,660,912 | 5/1972 | Laplume | 35/9 A |
| 3,706,844 | 12/1972 | Besier et al. | 242/188 |
| 3,861,619 | 1/1975 | Wolff | 242/188 |
| 3,872,608 | 3/1975 | Laplume | 35/9 A |
| 3,955,466 | 6/1976 | Goldmark | 84/470 |
| 4,343,024 | 8/1982 | Kawai | 360/74.6 |
| 4,410,148 | 10/1983 | Dunlap | 242/188 |

*Primary Examiner*—Leo P. Picard
*Attorney, Agent, or Firm*—Costas, Montgomery & Dorman

[57] ABSTRACT

A teaching system utilizing magnetic tape which is prepared in sectors with a message segment and position indicators in the form of transparent windows which are photoelectrically detected. After a message or question is played, a first window is detected by a first detector and the tape drive motor is de-engergized with another window positioned before one of a plurality of other detectors. The operator then attempts to answer or identify the message by making a selection corresponding to one of the plurality of detectors, and if a correct answer is given, a signal is given to the operator.

8 Claims, 5 Drawing Figures

TEACHING SYSTEM UTILIZING MAGNETIC TAPE

FIELD OF THE INVENTION

This invention relates to a teaching or instructional device which utilizes magnetic tape in conjunction with a tape player.

BACKGROUND OF THE INVENTION

Teaching systems utilizing magnetic tape and a compatible tape playback mechanism have been suggested in the past, for example, U.S. Pat. No. 3,222,597, where instructions are recorded for a technician in step-by-step segments.

Pat. No. 3,872,608 discloses a teaching machine utilizing a magnetic tape with pre-recorded questions and answers in digital code. An answer key generates a digital code which is coincident with a code on a tape and communication is made that the answer is correct. U.S. Pat. No. 3,660,912 discloses a teaching machine utilizing a magnetic tape with pre-recorded instructions and questions where the student utilizes a conductive marker to pierce an answer sheet and establish an electrical circuit to respond to a question.

The present invention provides a new and improved instructional device wherein sectors of the tape may have a pre-recorded message thereon, which message may be in the form of a musical note to be identified, or may be a question. When the message is played, the tape is stopped automatically, the operator selects one of a plurality of identification or selection keys or switches in response to the recorded message. If the operator chooses the correct selection device corresponding to the recorded message, an indication is given of a correct answer, and the operator may then restart the tape drive to attempt to identify or correctly answer the next message in a succeeding sector of the tape.

SUMMARY OF THE INVENTION

Briefly stated, the invention in one form thereof comprises an educational or instructional system comprising a pre-prepared magnetic tape and a tape player including a drive motor for driving the tape and a playback head. In at least one sector of the tape there is a message recorded thereon; two windows for passing light through the tape; the message and each of the windows are at predetermined distances from each other along the length of the tape. After the message is played, the first window is detected and in response to such detection of the first window, the tape drive motor is de-energized. A plurality of other detecting means are positioned along the path of the tape and the position of the second window in the tape is selected such that said second window is adjacent one of the other detecting means. The system further comprises a plurality of operator selection or identification means, each corresponding to one of the other detecting means. Each of the operator selection means may be provided with a code to show an answer or response to the recorded message, and if the operator selects the correct response, a signal is given indicative of the selection of the correct response. Thereafter, the operator may restart the tape drive motor to listen to another sector of the tape. The invention is preferably embodied in a magnetic tape cassette and player therefor. The detecting means are photoelectric sensors, each comprising an emitter and detector on opposite sides of the tape. Both emitter and detector may be included in the cassette or only one of the emitter and detector with other in the tape player external of the cassette. The detecting means are preferably photo detectors comprising an emitter and a detector positioned so as to sense the defined windows.

An object of this invention is to provide a new and improved teaching or instruction apparatus which is very versatile in use utilizing magnetic tape.

Another object of this invention is to provide a simplified teaching system which requires little instruction.

Still another object of this invention is the provision of a new and improved device utilizing photoelectric detectors which may be included wholly or partially within the cassette to detect defined windows on the tape.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
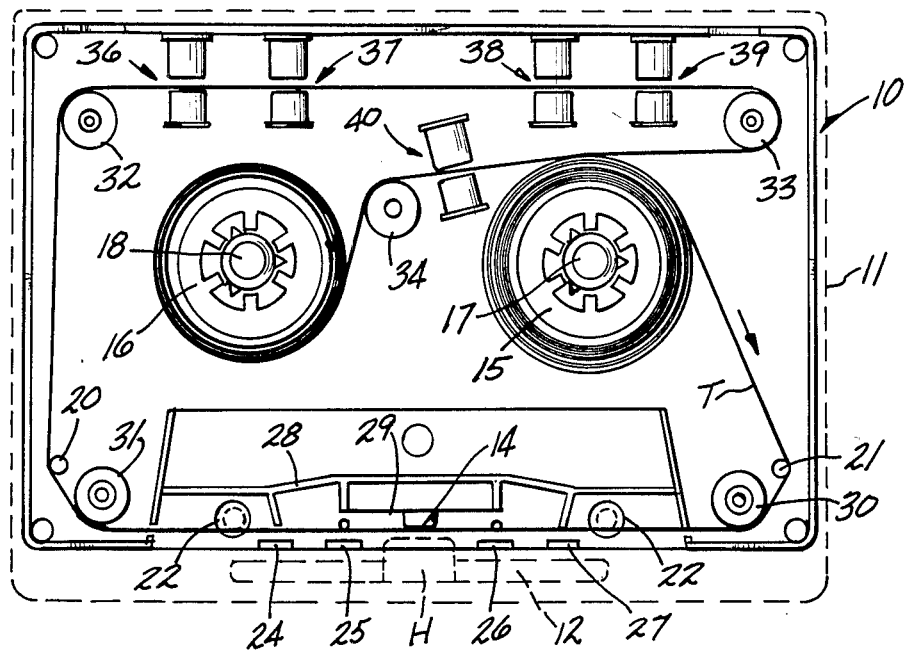
FIG. 1 is a plan view of a magnetic tape cassette embodying the invention seen from what may be considered the underside thereof.

Referring now to the drawings, FIG. 1 exemplifies a cassette 10 which has been modified in accordance with the invention. The cassette 10 is shown as included in a cassette player having a receptacle indicated by the broken line 11 and in which there is a playhead mechanism 12 which is movable into and from engagement with a tape T in the cassette against a pressure pad 14.

The cassette includes a payoff reel 15 and a takeup reel 16, each of which is adapted to engage a capstan 17 and 18, respectively of the cassette recorder.

As shown in FIG. 1, the cassette is viewed from the normal underside with the reel 15 being the payoff reel and the reel 16 being the takeup reel. The capstan 18 is the drive capstan driven by a motor of the recorder.

Figure 5:
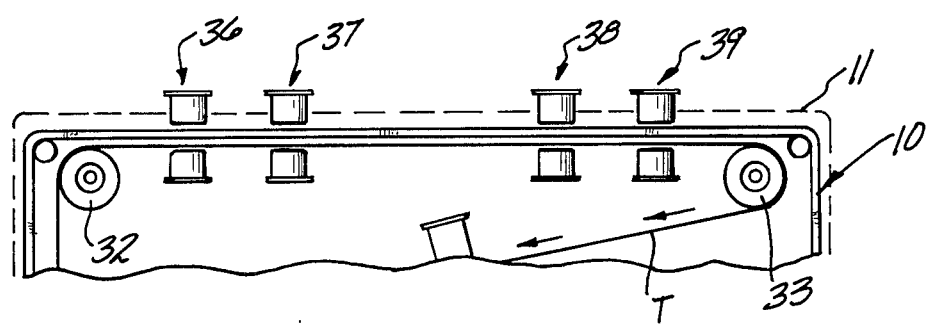
FIG. 5 is a fragmentary view similar to FIG. 1, but showing an alternate arrangement of the detecting means to the cassette of FIG. 1.

Throughout FIGS. 1 and 5, the portions of the cassette recorder and playback mechanism are shown in dotted line.

The cassette of FIG. 1 includes the usual guide pins 20 and 21, receptacles 22 for receiving a locating pin, a receptacle 23 which may also be utilized to receive a locating pin in the recorder, guide tangs 24, 25, 26 and 27, which guide the tape before the pressure pad 14, a stiffening structure 28, and a strip of resilient material 29, which holds pressure pad 14.

Cassette 10 is modified by the provision of tape guide members 30, 31, 32, 33 and 34 to define the path for tape T, as shown. The tape T leaves payoff reel 15 and travels about pin 21, guide 30, head H, and pressure pad 14, guide 33, pin 20, guide 32, guide 31, guide 34, and then to takeup reel 16. Tape T follows a path between photo detectors 36, 37, 38, 39 and 40.

Figure 2:
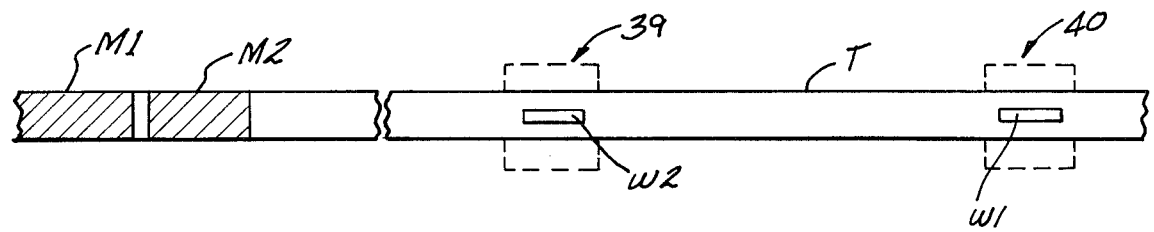
FIG. 2 illustrates a segment of magnetic tape utilized in the cassette of FIG. 1.

Reference is now made to FIG. 2 which exemplifies a sector of tape T. The sector of tape T, as shown, has recorded thereon two message segments M1 and M2. Spaced in predetermined positions with respect to the message segments are windows W2 and W1. As shown, window W2 is positioned before photo detector 39. Photo detectors 36-40 comprise an infra-red emitter and detector, which may be a Radio Shack 276-142 type, hereinafter described. The purpose of detector 40 is to sense the position of window W1 and stop the tape drive as hereinafter explained in detail.

The student, or user, will then close a switch corresponding to one of photo detectors 36-39 in response to the question or test, and will be informed if the answer is correct.

Figure 3:
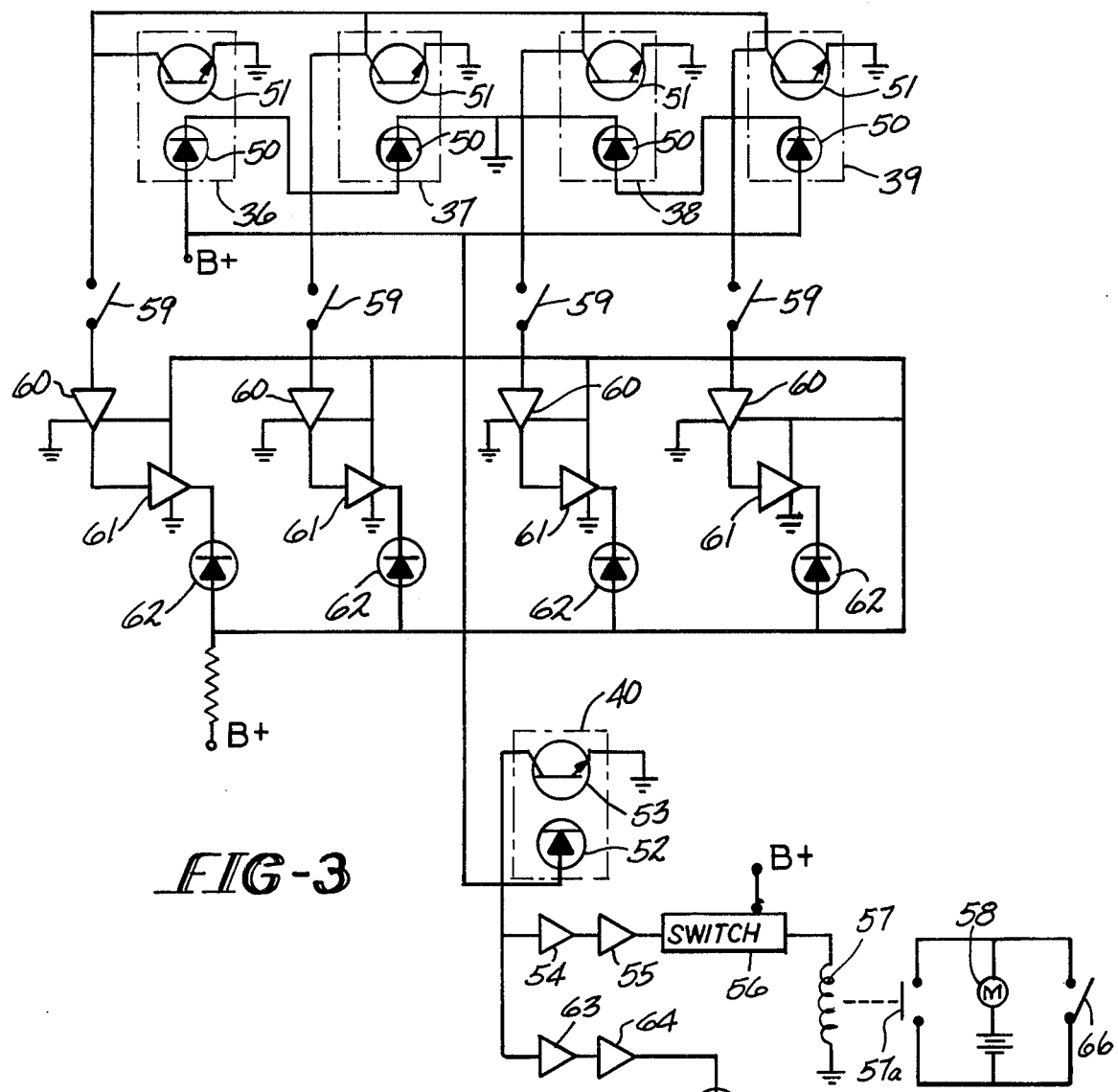
FIG. 3 is a schematic diagram of the electrical circuitry utilized in conjunction with the invention.

Reference is now made to the schematic diagram of FIG. 3. Each of the photo detectors 36-39 comprises a light emitting diode 50 and a photo detector 51. Photo detector 40 includes a light emitting diode 52 and a detector 53. In FIG. 3, the detectors 51 of each of photoconductors 36, 37, 38 and 39 are connected through a switch, and a pair of inverters to a light emitting diode. In each case, the circuits are identical and only the circuitry connected to photo detector 39 is described. Such light, if incident upon detector 51, will produce a signal if a closed circuit exists. Considering the photo detector 40, and the tape sector of FIG. 2, when window W1 is detected by photo detector 40, the emitter of detector 53 goes to ground. This low signal is amplified to an inverter 54 which applies a high output to the input of a second inverter 55. The low output of inverter 55 operates a switch 56 which energizes a relay coil 57. Coil 57 will open its contact 57a and de-energize tape drive motor 58. The message segments M1 and M2 are positioned with respect to window W1 so that immediately after the messages are played, window W1 is sensed by detector 40.

When the tape drive motor is de-energized, window W2 (FIG. 2) will be positioned in between the emitter 50 and detector 51 of photo detector 39, as shown, and the emitter 51 of photo detector 39 goes to ground. If a selection switch 59 is closed, the input to inverter 60 goes to ground and the output of a second inverter 61 also goes to ground. Light emitting diode 62 will then conduct and illuminate.

When the emitter 53 of photo detector 40 goes to ground, the output of inverter 63 goes high and the output of inverter 64 goes low. Light emitting diode 65 then conducts and illuminates. This indicates that the tape is stopped, and the operator may make a selection by closing one of switches 59.

After a selection is made through one of switches 59, the tape drive motor may be restarted by momentarily closing a switch 66 connected across tape drive motor 58. As window W1 leaves photo detector 40, the output of inverter 54 goes low, the output of inverter 55 goes high, switch 56 opens, relay 57 is de-energized and its contact 57a closes across motor 58.

Figure 4:
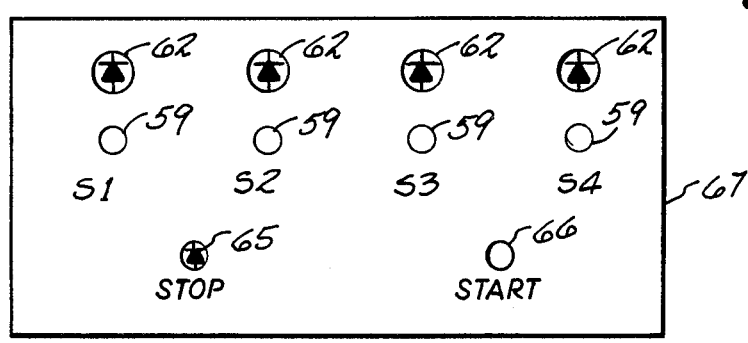
FIG. 4 is a view of an operator selection board utilized in conjunction with the invention.

Reference is now made to FIG. 4, which exemplifies an operator console or control panel 67, which may be included in the tape player or may be external thereto. The panel 67 includes the four light emitting diodes 62. Light emitting diode 65, when illuminated, will indicate that the tape is stopped and the operator should make a selection. Panel 67 further includes motor start switch 66 which the operator may close to restart the motor 58. The start switch 66 need only be depressed briefly, since as soon as the window W1 leaves detector 40, switch 66 will turn off.

Prior to restarting motor 58, the operator will make a selection by closing one of the switches 59. In the present example, if the operator closes the switch 59 associated with photo detector 39, the associated light emitting diode (LED) 62 will illuminate and indicate to the operator that the operator has chosen the correct answer. The possible selections are indicated as S1–S4 with respect to the four switches 59.

A coded overlay sheet, not shown, may be placed on or over the panel of FIG. 4, to indicate the choice of selections.

The invention has been practiced in teaching a student to recognize the interval between two musical notes. Consider the message segments to be the notes C and E. Then one of the switches 59 would be coded for the interval Major 3rd, and the other switches coded for other intervals. If the student properly identifies the interval, the LED 62 associated with properly selected switch 59 will be illuminated.

Reference is now made to FIG. 5 which exemplifies an alternate embodiment of the invention wherein either the detector or emitter of each of the photo detectors 36–39 may be positioned in the cassette, and the other in the cassette player.

It may thus be seen that the objects of the invention set forth, as well as those made apparent from the foregoing description, are efficiently attained. While preferred embodiments of the invention have been set forth for purposes of disclosure; however, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. An educational system comprising a pre-prepared magnetic tape and a tape player including a drive motor for driving said tape and a playback head, said tape including at least one sector which has a message recorded thereon and two windows for passing light through the tape, said message sector and said windows being at predetermined distances from each other, first means positioned along the path of the tape for photoelectrically detecting one of said windows and de-energizing said drive motor after the recorded message has passed said head, a plurality of other photoelectric detecting means positioned along the path of said tape, the position of said second window in said tape being selected such that said second window is adjacent one of said other detecting means when said one of said windows is detected by said first detecting means, a plurality of operator selection means, each corresponding to one of said other detecting means, the recorded message posing a question or choice of selection to the operator, and means for indicating that operation of one of said selection means corresponds to said detecting means adjacent said second window.

2. The system of claim 1 where said tape is embodied in a cassette.

3. The system of claim 2 where said first means and said plurality of other photoelectric detecting means are embodied within said cassette.

4. The system of claim 2 where said tape player is a tape cassette player, said plurality of photoelectric detecting means each comprise a light emitting element and a light detecting element, said cassette is of a transparent material, and one of said plurality of light emitting elements and said plurality of light detecting elements being positioned in said cassette and the other being positioned in said tape player.

5. The system of claim 2 including guide means in said cassette defining a path for said tape from a payoff reel past a tape playing head past said plurality of other photoelectric detecting means, said first means and to a takeup reel.

6. The system of claim 1 wherein said operator selection means are a plurality of switches each corresponding to one of said plurality of other photoelectric detecting means.

7. The system of claim 6 where a light emitting diode is in circuit with each of said switches and visually indicates if selection of a switch corresponds with a predetermined one of said other photoelectric devices.

8. The system of claim 1 where said windows are horizontally elongated and positioned at the center of the tape intermediate the edges of the tape.

* * * * *